United States Patent
Robbins et al.

(10) Patent No.: US 6,494,428 B1
(45) Date of Patent: Dec. 17, 2002

(54) ADJUSTABLE HOLDER FOR A CONTAINER

(75) Inventors: Rodney W. Robbins, Florence, AL (US); Oscar Sean Mitchell, Florence, AL (US)

(73) Assignee: Robbins Industries Inc., Florence, AL (US)

( * ) Notice: Subject to any disclaimer, the term of this patent is extended or adjusted under 35 U.S.C. 154(b) by 0 days.

(21) Appl. No.: 09/487,633

(22) Filed: Jan. 14, 2000

(51) Int. Cl.[7] .................................................. A47K 1/08
(52) U.S. Cl. ................................ 248/311.2; 248/316.6; 248/346.07
(58) Field of Search ......................... 248/311.2, 313, 248/316.4, 316.6, 346.06, 346.07; 280/633

(56) References Cited

U.S. PATENT DOCUMENTS

| | | | | |
|---|---|---|---|---|
| 2,665,100 A | * | 1/1954 | Jason | |
| 4,279,048 A | * | 7/1981 | Bundschuh et al. | 280/633 |
| 4,620,488 A | * | 11/1986 | Formo | |
| 4,874,099 A | * | 10/1989 | Arnott et al. | 211/50 |
| 4,943,111 A | * | 7/1990 | VanderLaan | 297/194 |
| D323,766 S | | 2/1992 | Robbins et al. | |
| 5,183,163 A | * | 2/1993 | Slaiken | 211/43 |
| 5,280,870 A | * | 1/1994 | Chick et al. | 248/311.2 |
| 5,573,214 A | * | 11/1996 | Jones et al. | 248/311.2 |
| D407,250 S | * | 3/1999 | Avery et al. | D6/528 |
| 6,053,338 A | * | 4/2000 | Avery et al. | 211/65 |
| D425,345 S | * | 5/2000 | Ohm et al. | D6/515 |
| D436,537 S | * | 1/2001 | Robbins et al. | D7/590 |

FOREIGN PATENT DOCUMENTS

DE 3150098 A1 * 7/1982
DE 3150099 A1 * 7/1982

* cited by examiner

*Primary Examiner*—Anita King
*Assistant Examiner*—Naschica S. Morrison
(74) *Attorney, Agent, or Firm*—Charles E. Bruzga

(57) ABSTRACT

An adjustable holder for a container comprises a stationery member having a first surface for pressing against a first side of the container. A moveable member has a second surface for pressing against a second side of the container. First and second structures allow the moveable member to telescope with respect to the stationary member along a direction of adjustment. Third and fourth structures set a plurality of distances between the first and second surfaces. The third structure comprises a plurality of slots arranged along the direction of adjustment and oriented generally orthogonal to such direction. The fourth structure comprises a resiliently biased projection with a user-operated handle for being inserted into a desired slot. The holder adjusts to the size of the container, and, in preferred embodiments, can be made especially economically.

20 Claims, 4 Drawing Sheets

ADJUSTABLE HOLDER FOR A CONTAINER

FIELD OF THE INVENTION

The present invention relates to an adjustable holder for a container and, more particularly, to a holder that is economical to make.

BACKGROUND OF THE INVENTION

Holders for containers such as spice jars or the like are known in the art. They can be easily mounted on the inside of a door of an existing kitchen cabinet, for instance, and may occupy space that is normally wasted.

It would be desirable to provide a holder for a container that adjusts to the size of the container, so that a spice jar can be interchanged with a soup can, and so forth. It would further be desirable to provide such a holder that can be made economically.

SUMMARY OF THE INVENTION

An exemplary embodiment of the inventive holder for a container comprises a stationery member having a first surface for pressing against a first side of the container. A moveable member has a second surface for pressing against a second side of the container. First and second structures allow the moveable member to telescope with respect to the stationary member along a direction of adjustment. Third and fourth structures set a plurality of distances between the first and second surfaces. The third structure comprises a plurality of slots arranged along the direction of adjustment and oriented generally orthogonal to such direction. The fourth structure comprises a resiliently biased projection with a user-operated handle for being inserted into a desired slot.

The foregoing provides a holder for a container that adjusts to the size of the container, and that, in preferred embodiments, can be made especially economically.

DETAILED DESCRIPTION OF THE INVENTION

Figure 1:
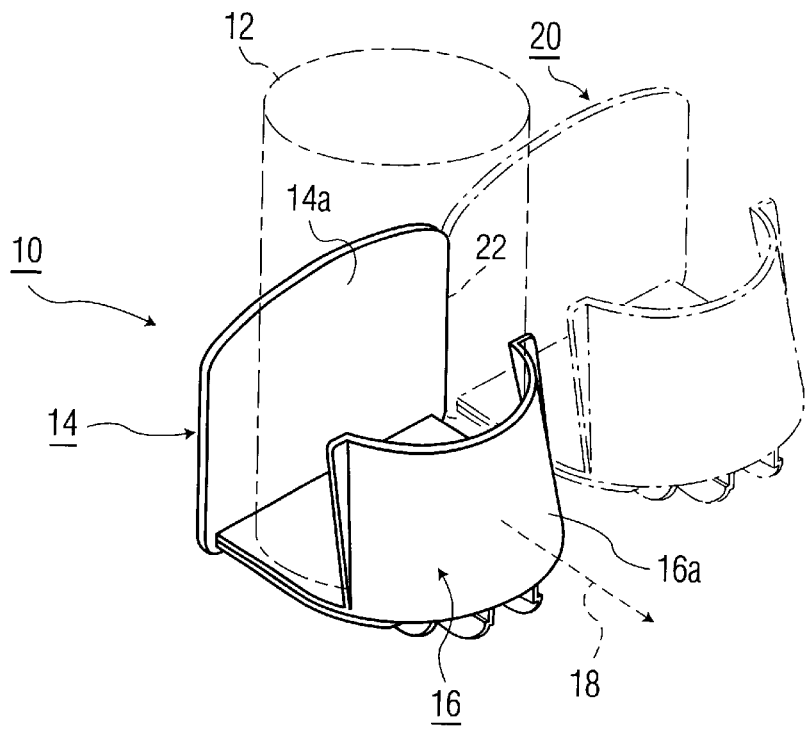
FIG. 1 is a perspective view of a pair of holders for containers in accordance with the invention.

FIG. 1 shows a preferred holder 10 for a container 12 in accordance with the invention. The container, shown in phantom for ease of illustration, may comprise a spice jar or soup can, by way of example. Container 10 includes a stationary member 14 and a movable member 16. The stationary member may be adhered to a vertical wall or door, for instance, by adhesive or other means (not shown). Movable member 16 can be adjusted along a direction 18 by making arcuate wall 16a of member 16 somewhat flexible and, additionally, by various structures described below. Arcuate wall 16a generally conforms to the surface of jar 12 pressing against it. Wall 16a is preferably thinner than wall 14a. Members 14 and 16 can be formed from PBS or other material as will be apparent to those of ordinary skill in the art.

A second holder 20, shown in phantom, can be attached the first holder 10 along a narrow seam or perforated region 22. A user can easily separate the two holders from each other by, for instance, flexing region 22 to weaken it and then severing the holders from one another with scissors.

Figure 2:
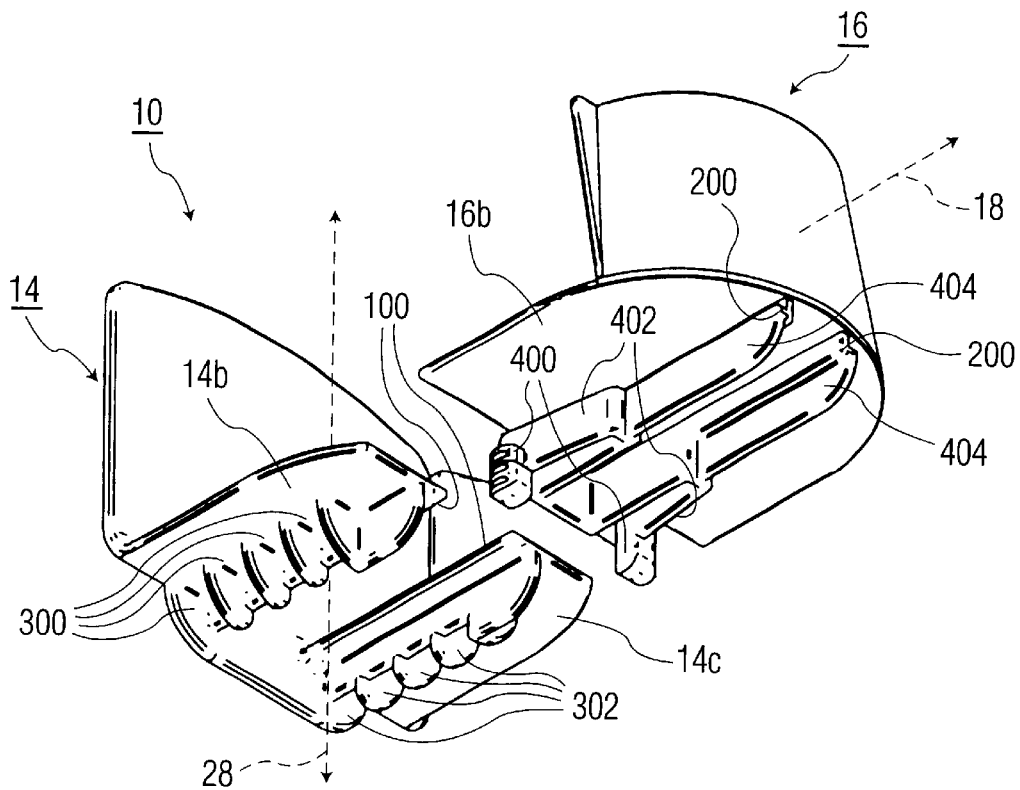
FIG. 2 is an exploded, perspective view from beneath a single holder in which a moveable member is shown spaced apart from a stationary member for ease of illustration.

FIG. 2 shows moveable member 16 spaced apart from the stationary member 14 for ease of illustration. Normally, movable member 16 is engaged with stationary member 14, as shown in FIG. 1, for instance. Generally horizontal portions 14b and 14c of the stationary member form a generally horizontal support of that member, which can support at least part of a container (not shown) or movable member 16. Movable member 16 similarly includes a generally horizontal support 16b, which can support at least part of a container (not shown).

Figure 3:
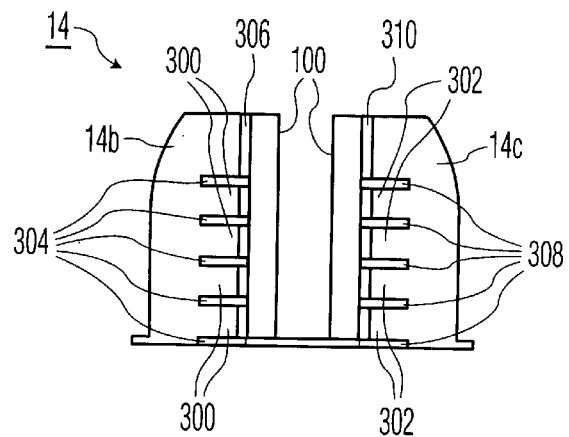
FIG. 3 is a bottom view of the stationary member of FIGS. 1 and 2.

Telescoping with First and Second Structures A preferred structure for allowing the movable member to telescope with respect to the stationary member along the direction of adjustment 18 is now described. That structure, referred to herein as the "first" structure with reference numerals in the 100's series, includes a pair of spaced, substantially parallel, confronting edges 100. Edges 100 preferably comprise the confronting edges of support portions 14b and 14c. Edges 100 may be more easily viewed in FIG. 3, showing the underside of stationary member 14.

Figure 4:
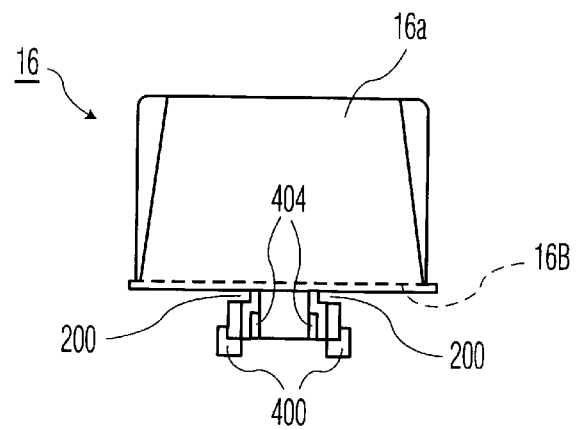
FIG. 4 is a front view of the moveable member of FIGS. 1 and 2, taken from the right-hand side of those figures.

A "second" structure, with reference numerals in the 200's series, includes a pair of substantially parallel grooves 200 facing in opposing directions, for respectively receiving the pair of confronting edges 100. Grooves 200 can be more easily seen in the front plan view of movable member 16 in FIG. 4 taken from the right side of FIG. 1. As shown in FIGS. 2 and 4, the upper wall of the grooves may comprise support 16b, as is preferred. As further shown in such figures, respective lower walls of the grooves may comprise support walls 404 on which resiliently biased projections 400 are mounted.

The telescoping action of the first and second structures will be further described below. Other types of telescoping structures can be employed in some embodiments of the invention. The other types (not shown) may include an elongated projection depending from one member that fits within a rectangular enclosure or other enclosure on the other member, torsion adjustment structures, spring-loaded twist structures and others as will be apparent to those of ordinary skill in the art.

Adjustment with Third and Fourth Structures

A "third" structure, numbered in the 300's series, comprises a plurality of slots 300 arranged along the direction of adjustment 18, and oriented generally downwardly. Preferably, a second plurality of slots 302, similar to slots 300, is arranged in parallel with slots 300. The underside view of stationary member 14 in FIG. 3 shows spaced walls 304 depending downwardly from support portion 14*b*, which form respective slots 300 between adjacent walls. Wall 306 depends downwardly from support portion 14*b*, and integrally intersects walls 300. Walls 308 and 310 respectively correspond to walls 304 and 306, but depend instead from support portion 14*c*.

FIGS. 2 and 4 show resiliently biased projections 400, comprising part of a "fourth" structure for adjustment purposes. The lowermost extremities of projections 400 form user operated handles for manipulating the projections. The projections 400 depend from resilient arms 402, in turn depending from walls 404 mounted to the underside the support 16*b*.

The interaction of the third and fourth structures will be further described below.

Operation

Figure 5:
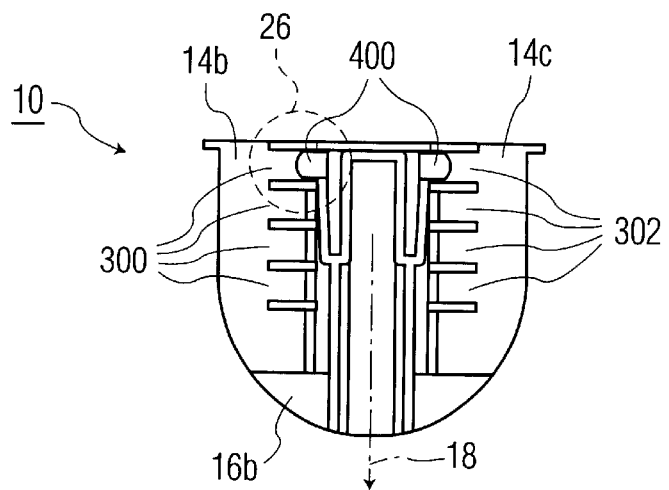
FIG. 5 is bottom view of the holder of FIG. 1.

FIG. 5 shows the underside of holder 10 arranged to have the smallest opening for a container (not shown). In this position, projections 400 are arranged in respective ones of the uppermost-shown slots 300 and 302. The three lower-shown pairs of slots 300 and 302 indicate three further adjustment positions.

Figure 6A:
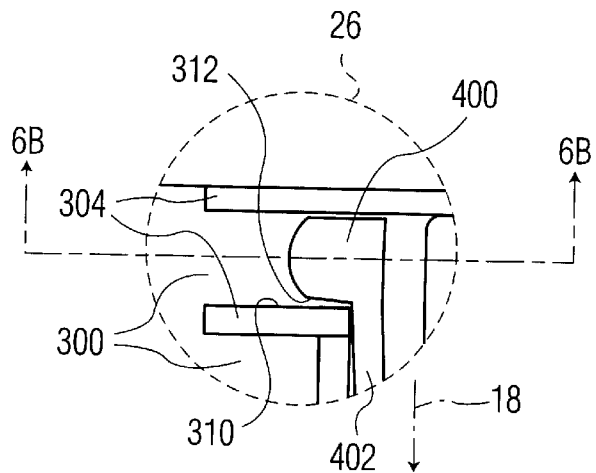
FIG. 6A is an enlarged detail view of adjustment structures taken within dashed-line circle 26 of FIG. 5.

FIG. 6A is an enlarged detail of adjustment structures taken within dashed-line circle 26 of FIG. 5. FIG. 6A shows surfaces 310 and 312 respectively of wall 304 and of projection 400 held by resilient arm 402, which engage each other when a container is securely held by holder 10. Engaging surfaces 310 and 312 are preferably shaped to maintain the projection in such slots in the absence of the handle being operated when a container presses apart walls 14*a* and 16*a* (FIG. 1) in normal operation. To achieve this, a major portion of each of engaging surfaces 310 and 312 (and other engaging surfaces in the holder) is preferably oriented substantially orthogonal to direction of adjustment 18. By "substantially orthogonal" is meant within approximately 6 degrees of exactly orthogonal, or within a greater range preferably below about 7-degrees so long as projection 400 is maintained within slot 300 in a normal container-holding situation.

Figure 6B:
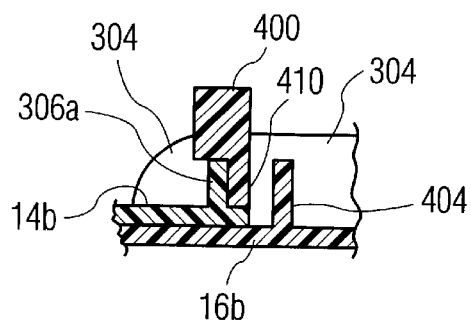
FIG. 6B is a cross-sectional view taken at arrows 6B—B in FIG. 6A.

FIG. 6B is a cross-sectional view taken at arrows 6B—6B in FIG. 6A. It shows how movement of projection 400 to the left is stopped by portion 306*a* of wall 306 (FIG. 3). More particularly, the lower portion 410 of projection 400 presses to the left against wall portion 306*a*. Wall 306 of FIG. 3, which includes portion 306*a* and similar wall portions (not numbered), integrally intersects and supports walls 304.

Referring to FIG. 2, stationary member 14 and associated first and second structures in the 100's and 200's series of reference numerals preferably comprise a single, integral part manufactured from a two-piece injection mold (not shown). Similarly, movable member 16 and associated third and fourth structures in the 300's and 400's series of reference numerals preferably comprise a single, integral part manufactured from another two-piece injection mold (not shown).

It is especially preferred that each of stationary member 14 and movable member 16 be shaped so that each can be made from a two-piece mold of the straight-pull type. A straight pull mold is one in which cams or other movable parts are not used for releasing the parts from the mold. Such a mold itself is economical to make and operate, so that parts it produces can be made especially economically.

Molding the Stationary Member

Figure 7:
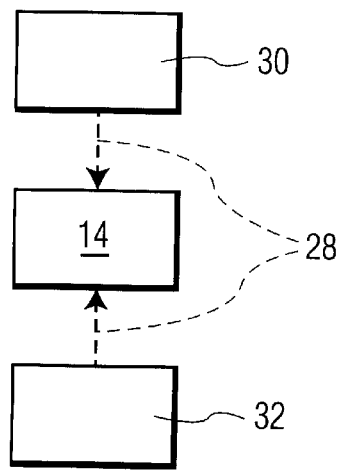
FIG. 7 is a block diagram of a pair of mold halves for making the stationary member of FIGS. 1 and 2.
Figure 8:
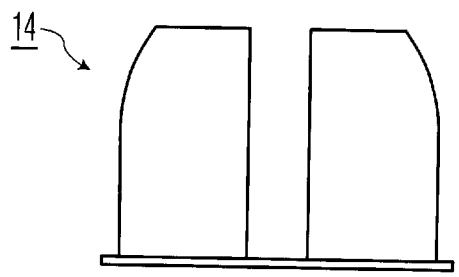
FIG. 8 is a top view of the stationary member of FIGS. 1 and 2.

FIG. 2 shows a vertical direction 28 orthogonal to direction of adjustment 18. As shown in FIG. 7, in producing stationary member 14, a straight-pull mold may comprise two halves 30 and 32 that come together along direction 28 with a cavity between them (not shown) defining member 14. Direction 28 need not be vertical in connection with orientating the mold, but reference to upper and lower mold halves will be made for convenience. Referring to FIG. 3, a bottom view of member 14, appropriate shaping of the mold requires substantially all surfaces that are exposed to "lower" half 32 of the mold (FIG. 7) to be visible in that view, or, in other words, not formed on an undercut portion that cannot be seen in that view. Referring to FIG. 8, a top view of member 14, appropriate shaping of the member requires substantially all surfaces that are exposed to "upper" half 30 of the mold (FIG. 7) to be visible in that view, or, in other words, not formed on an undercut portion that cannot be seen in that view.

The foregoing can be expressed in terms of mold geometry. All active surfaces (not shown) of "upper" half 30 of the mold (FIG. 7) should conform to the surfaces visible in FIG. 8, and all active surfaces (not shown) of "lower" half 32 of the mold (FIG. 7) should conform to the surfaces visible in FIG. 3. By "active" surface is meant a surface forming the mentioned cavity between mold halves.

Molding the Movable Member

Figure 9:
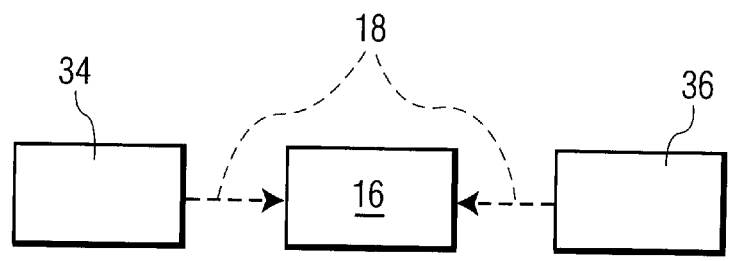
FIG. 9 is a block diagram of a pair of mold halves for making the moveable member of FIGS. 1 and 2.
Figure 10:
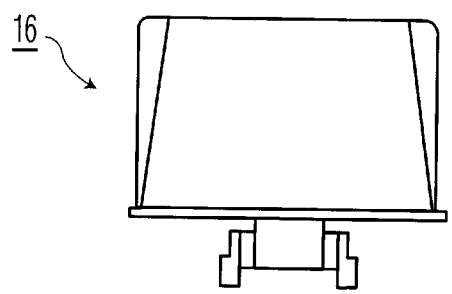
FIG. 10 is a rear view of the moveable member of FIGS. 1 and 2, taken from the left-hand side of those figures.

FIG. 2 shows a direction 18. As shown in FIG. 9, in producing moveable member 16, a straight-pull mold may comprise two halves 34 and 36 that come together along direction 18 with a cavity between them defining member 16. Direction 18 need not be horizontal in connection with orientating the mold, but reference to right and left mold halves will be made for convenience. Referring to the front view of FIG. 4, taken from the right side of movable member 16 in FIG. 1, appropriate shaping of the member requires substantially all surfaces that are exposed to "right" half 36 of the mold (FIG. 9) to be visible in that view, or, in other words, not formed on an undercut portion that cannot be seen in that view. Referring to FIG. 10, a rear view of member 16 taken from the left side of stationary member 16 in FIG. 1, appropriate shaping of the member requires substantially all surfaces that are exposed to "left" half 34 of the mold (FIG. 9) to be visible in that view, or, in other words, not formed on an undercut portion that cannot be seen in that view.

In terms of mold geometry, all active surfaces (not shown) of "right" half 36 of the mold (FIG. 9) should conform to the surfaces visible in FIG. 4, and all active surfaces (not shown) of "left" half 34 of the mold (FIG. 9) should conform to the surfaces visible in FIG. 10.

While the invention has been described with respect to specific embodiments by way of illustration, many modifications and changes will occur to those skilled in the art. For instance, directions of "downwardly," "horizontally," "vertically" and so on refer to directions for a holder in normal use unless otherwise indicated. Additionally, it is desired but not necessary to use in FIG. 5, for instance, two rows of slots 300 and 302 and a pair of projections 400 that can be easily squeezed together by a user; only one row of slots and one projection could be used. It is, therefore, to be understood that the appended claims are intended to cover all such modifications and changes as fall within the true scope and spirit of the invention.

What is claimed is:

1. An adjustable holder for a container, comprising:

a) a stationary member having a first surface for pressing against a first side of the container;

b) a moveable member having a second surface for pressing against a second side of the container;

c) first and second structures for allowing the moveable member to telescope with respect to the stationary member along a direction of adjustment; and d) third and fourth structures for setting a plurality of distances between the first and second surfaces;
   i) the third structure comprising a plurality of slots arranged along the direction of adjustment and oriented generally orthogonal to the direction of adjustment; and
   ii) the fourth structure comprising a resiliently biased projection for being inserted into a desired slot, the projection having a handle that is directly manipulable by a user;

e) engaging surfaces of the projection and associated wall of the desired slot being shaped to maintain the projection in the slot in the absence of the handle being operated when the first and second walls are pressed apart in normal operation; respective major portions of the engaging surfaces being oriented within approximately 7 degrees of orthogonal to the direction of adjustment.

2. The holder of claim 1, wherein engaging surfaces of the projection and associated wall of the desired slot are shaped to maintain the projection in the slot in the absence of the handle being operated when the first and second walls are pressed apart in normal operation.

3. The holder of claim 1, wherein respective major portions of the engaging surfaces are oriented within approximately 6 degrees of orthogonal to the direction of adjustment.

4. The holder of claim 1, wherein the first and third structures are associated with the stationary member.

5. The holder of claim 1, wherein the first structure comprises a plurality of downwardly extending walls defining slots between adjacent pairs of the walls.

6. The holder of claim 5, wherein:
   a) the first structure comprises a pair of spaced, substantially parallel, confronting edges; and
   b) the second structure comprises a pair of substantially parallel grooves facing in opposing directions, for respectively receiving the pair of confronting edges.

7. The holder of claim 6, wherein the edges comprise edges of a generally horizontal support of one of the stationary and moveable members.

8. The holder of claim 6, wherein an upper wall of the grooves comprises a generally horizontal support of one of the stationary and moveable members.

9. An adjustable holder for a container, comprising:
   a) a stationary member having a first surface for pressing against a first side of the container;
   b) a moveable member having a second surface for pressing against a second side of the container;
   c) first and second structures for allowing the moveable member to telescope with respect to the stationary member along a direction of adjustment;
      i) the first structure comprising a pair of spaced, substantially parallel, confronting edges; and
      ii) the second structure comprising a pair of substantially parallel grooves facing in opposing directions, for respectively receiving the pair of confronting edges; an upper wall of the grooves comprising a generally horizontal support of one of the stationary and moveable members; a lower wall of the grooves comprising a support on which a resiliently biased projection is mounted; and d) third and fourth structures for setting a plurality of distances between the first and second surfaces;
   i) the third structure comprising a plurality of downwardly extending walls defining slots between adjacent pairs of the walls; the slots being arranged along the direction of adjustment and being oriented generally orthogonal to the direction of adjustment; and
   ii) the fourth structure comprising the resiliently biased projection for being inserted into a desired slot, the projection having a handle that is directly manipulable by a user.

10. An adjustable holder for a container, comprising:
   a) a stationary member having a first surface for pressing against a first side of the container;
   b) a moveable member having a second surface for pressing against a second side of the container;
   c) first and second structures for allowing the moveable member to telescope with respect to the stationary member along a direction of adjustment; and
   d) third and fourth structures for setting a plurality of distances between the first and second surfaces;
      i) the third structure comprising first and second pluralities of slots each of which is arranged along the direction of adjustment and oriented generally orthogonal to the direction of adjustment; and
      ii) the fourth structure comprising a pair of resiliently biased projections for being respectively inserted into a desired slot in the first plurality of slots and a desired slot in the second plurality of slots, each of the projections having a handle that is directly manipulable by a user;
   e) engaging surfaces of the projections and associated walls of the desired slots being shaped to maintain the projections in the slots in the absence of the handle being operated when the first and second walls are pressed apart in normal operation; respective major portions of the engaging surfaces being oriented within approximately 7 degrees of orthogonal to the direction of adjustment.

11. The holder of claim 10, wherein the engaging surfaces of the projections and associated walls of the desired slots are shaped to maintain the projections in the slot in the absence of the handle being operated when the first and second walls are pressed apart in normal operation.

12. The holder of claim 10, wherein respective major portions of the engaging surfaces are oriented within approximately 6 degrees of orthogonal to the direction of adjustment.

13. The holder of claim 10, wherein the first and third structures are associated with the stationary member.

14. The holder of claim 10, wherein the third structure comprises a plurality of downwardly extending walls defining slots between adjacent pairs of the walls.

15. The holder of claim 14, wherein:
   a) the first structure comprises a pair of spaced, substantially parallel, confronting edges; and
   b) the second structure comprises a pair of substantially parallel grooves facing in opposing directions, for respectively receiving the pair of confronting edges.

16. The holder of claim 15, wherein the edges comprise edges of a generally horizontal support of one of the stationary and moveable members.

17. The holder of claim 15, wherein an upper wall of the grooves comprises a generally horizontal support of one of the stationary and moveable members.

18. An adjustable holder for a container, comprising:
a) a stationary member having a first surface for pressing against a first side of the container;
b) a moveable member having a second surface for pressing against a second side of the container;
c) first and second structures for allowing the moveable member to telescope with respect to the stationary member along a direction of adjustment;
  i) the first structure comprising a pair of spaced, substantially parallel, confronting edges; and
  ii) the second structure comprising a pair of substantially parallel grooves facing in opposing directions, for respectively receiving the pair of confronting edges; an upper wall of the grooves comprising a generally horizontal support of one of the stationary and moveable members; a lower wall of the grooves comprising a support on which a pair of resiliently biased projections are mounted; and
d) third and fourth structures for setting a plurality of distances between the first and second surfaces;
  i) the third structure comprising first and second pluralities of slots each of which is arranged along the direction of adjustment and oriented generally orthogonal to the direction of adjustment; the third structure comprising a plurality of downwardly extending walls defining slots between adjacent pairs of the walls; and
  ii) the fourth structure comprising the pair of resiliently biased projections for being respectively inserted into a desired slot in the first plurality of slots and a desired slot in the second plurality of slots, each of the projections having a handle that is directly manipulable by a user.

19. An adjustable holder for a container, comprising:
a) a stationary member having a first surface for pressing against a first side of the container;
b) a moveable member having a second surface for pressing against a second side of the container;
c) first and second structures for allowing the moveable member to telescope with respect to the stationary member along a direction of adjustment; and
d) third and fourth structures for setting and maintaining a plurality of distances between the first and second surfaces;
  i) the third structure comprising a plurality of slots arranged side-by-side along the direction of adjustment and oriented generally orthogonal to such direction; and
  ii) the fourth structure comprising a single, resiliently biased projection with a user-operated handle for being inserted into a desired slot when the handle is directly manipulated by a user; the projection being the only projection for being inserted into any slot of the plurality of slots for setting a plurality of distances between the first and second surfaces;
e) engaging surfaces of the projection and associated wall of the desired slot being shaped to maintain the projection in the slot in the absence of the handle being operated during conditions of the container being a soup can and the stationary member being mounted on a door of a kitchen cabinet during normal opening or closing of the door; and
f) respective major portions of the engaging surfaces being oriented within approximately 7 degrees of orthogonal to the direction of adjustment.

20. An adjustable holder for a container, comprising:
a) a stationary member having a first wall with a first surface for pressing against a first side of the container;
b) a moveable member having a second wall with a second surface for pressing against a second side of the container; the second wall projecting away from a base on which it is mounted in a generally linear manner, and being arcuately shaped to generally conform to the surface of the container;
c) first and second structures for allowing the moveable member to telescope with respect to the stationary member along a direction of adjustment; and
d) third and fourth structures for setting a plurality of distances between the first and second surfaces;
  i) the third structure comprising a plurality of slots arranged side-by-side along the direction of adjustment and oriented generally orthogonal to the direction of adjustment; and
  ii) the fourth structure comprising a resiliently biased projection for being inserted into a desired slot, the projection having a handle that is directly manipulable by a user;
e) the distance between the first and second walls also able to be set by having the second wall being inclined from its base towards the first wall and the second wall being somewhat flexible so that it can be flexed;
f) engaging surfaces of the projection and associated wall of the desired slot being shaped to maintain the projection in the slot in the absence of the handle being operated when the first and second walls are pressed apart in normal operation with the second wall being flexed along the direction of adjustment away from the first wall; and
g) respective major portions of the engaging surfaces being oriented within approximately 7 degrees of orthogonal to the direction of adjustment.

* * * * *